(12) United States Patent
Gilmore

(10) Patent No.: US 6,481,563 B1
(45) Date of Patent: Nov. 19, 2002

(54) EXTENDABLE CONVEYOR WITH ADDITIONAL BOOM SECTION

(75) Inventor: Phillip J. Gilmore, Healdsburg, CA (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 0 days.

(21) Appl. No.: 09/474,700

(22) Filed: Dec. 29, 1999

(51) Int. Cl.[7] .................. B65G 65/02; B65G 15/26; B65G 17/28; B65G 21/10; B65G 21/14

(52) U.S. Cl. .................. 198/511; 198/588; 198/594; 198/812

(58) Field of Search .................. 198/511, 535, 198/588, 594, 812

(56) References Cited

U.S. PATENT DOCUMENTS

| | | | |
|---|---|---|---|
| 3,596,785 A | | 8/1971 | Weatherford, Jr. .......... 214/89 |
| 3,788,452 A | * | 1/1974 | McWlliams ............ 198/588 X |
| 3,819,068 A | | 6/1974 | Weir .......................... 214/38 |
| 3,835,980 A | | 9/1974 | Brooks, Jr. ................. 198/139 |
| 3,993,204 A | | 11/1976 | Hummel ...................... 214/89 |
| 4,643,299 A | | 2/1987 | Calundan .................... 198/812 |
| 5,009,560 A | | 4/1991 | Ruder et al. ................ 414/392 |
| 5,307,917 A | * | 5/1994 | Hall ........................ 198/812 X |
| 5,351,809 A | | 10/1994 | Gilmore et al. ............. 198/812 |
| 5,403,142 A | | 4/1995 | Stewart ...................... 414/392 |
| 5,423,413 A | | 6/1995 | Gilmore ..................... 198/594 |
| 5,487,462 A | | 1/1996 | Gilmore ..................... 198/594 |
| 5,642,803 A | | 7/1997 | Tanaka ....................... 198/535 |
| 5,685,416 A | * | 11/1997 | Bonnet .................... 198/812 X |
| 5,796,052 A | | 8/1998 | Christmannn ............... 177/145 |
| 6,006,893 A | * | 12/1999 | Gilmore et al. ......... 198/588 X |

FOREIGN PATENT DOCUMENTS

| | | |
|---|---|---|
| FR | 2525570 A | 10/1983 |
| GB | 2200613 A | 8/1988 |

\* cited by examiner

*Primary Examiner*—Christopher P. Ellis
*Assistant Examiner*—Gene O Crawford
(74) *Attorney, Agent, or Firm*—Van Dyke, Gardner, Linn & Burkhart, LLP

(57) ABSTRACT

An outer extendable boom or extension is implemented on an extendable conveyor of conventional design, which includes at least two extendable units, each of which is nested within the next inwardly positioned unit and adjustably positioned between an extended position and a retracted position. The outer boom includes a pair of opposite side members which extend within an outer conventional extendable unit and a conveying surface. A support system is provided to support the outer boom as it extends and retracts within the outer extendable unit. A forward support member of the support system is laterally aligned with the side members and a cantilever support member is vertically spaced from a rearward end of the side members, such that a reduced range in width and a reduced range in height of the extendable units may be achieved. Accordingly, the outer boom or extension provides a substantial increase in the extendable reach of the conveyor assembly, while avoiding any adverse affect on the width of the conveying surfaces and the height of the conveying surface associated with the base unit. The present invention also provides for an extendable attachment to be implemented within a pre-existing conventional extendable conveyor assembly.

53 Claims, 8 Drawing Sheets

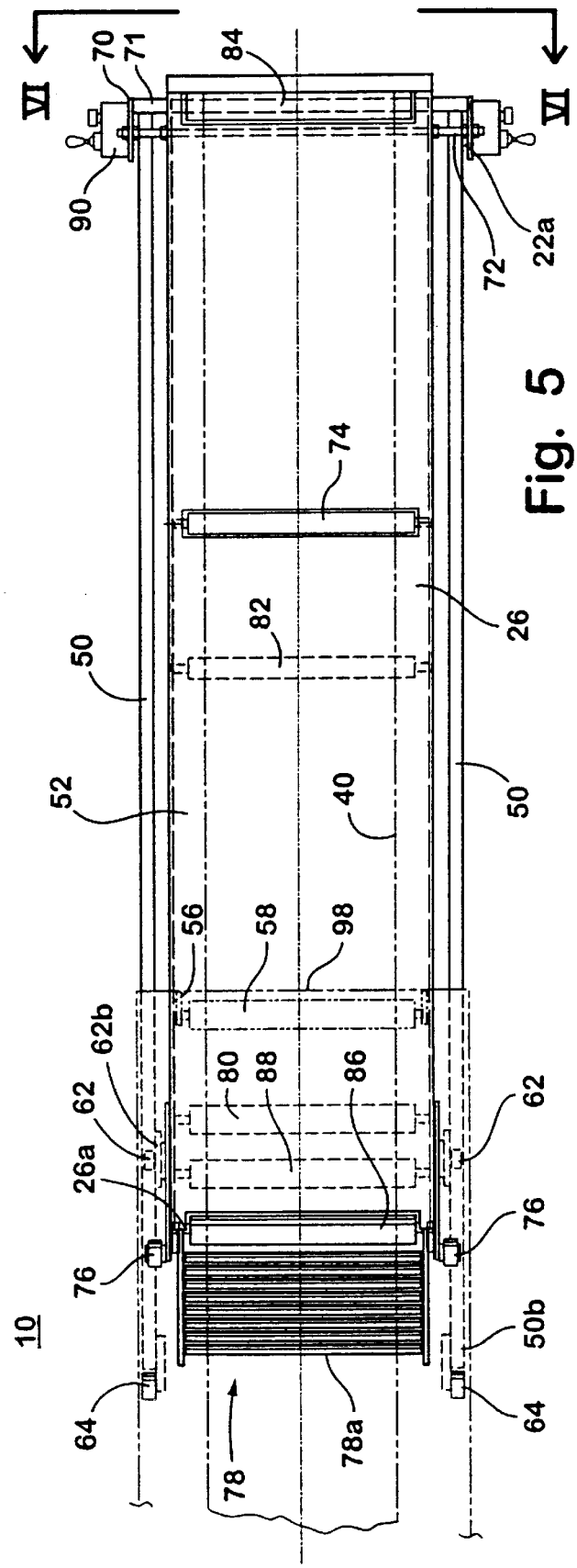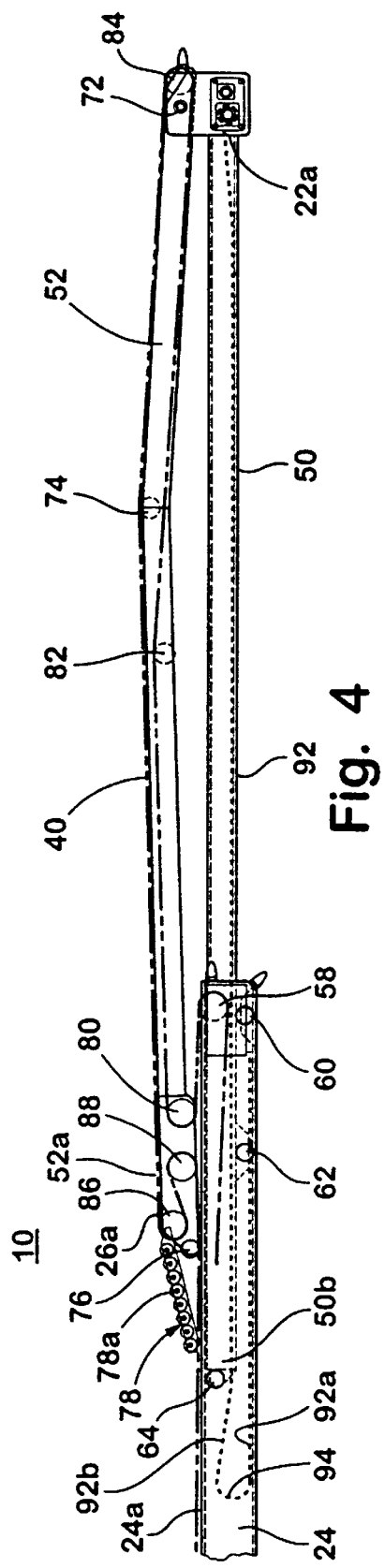

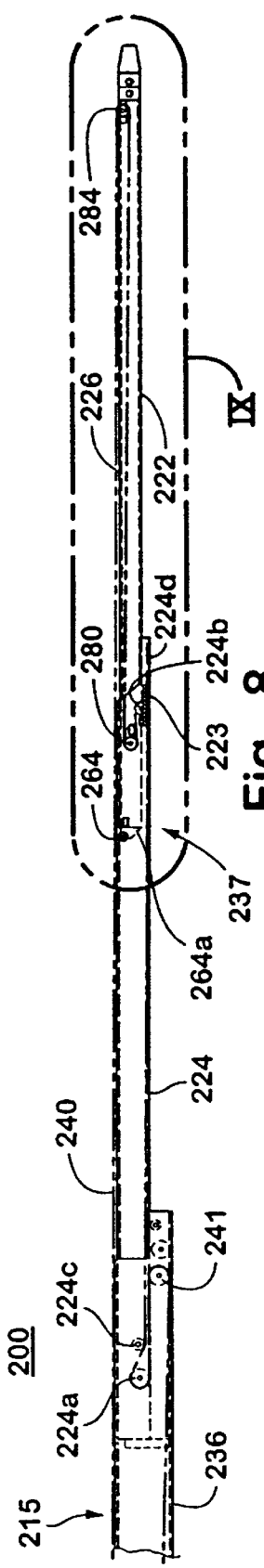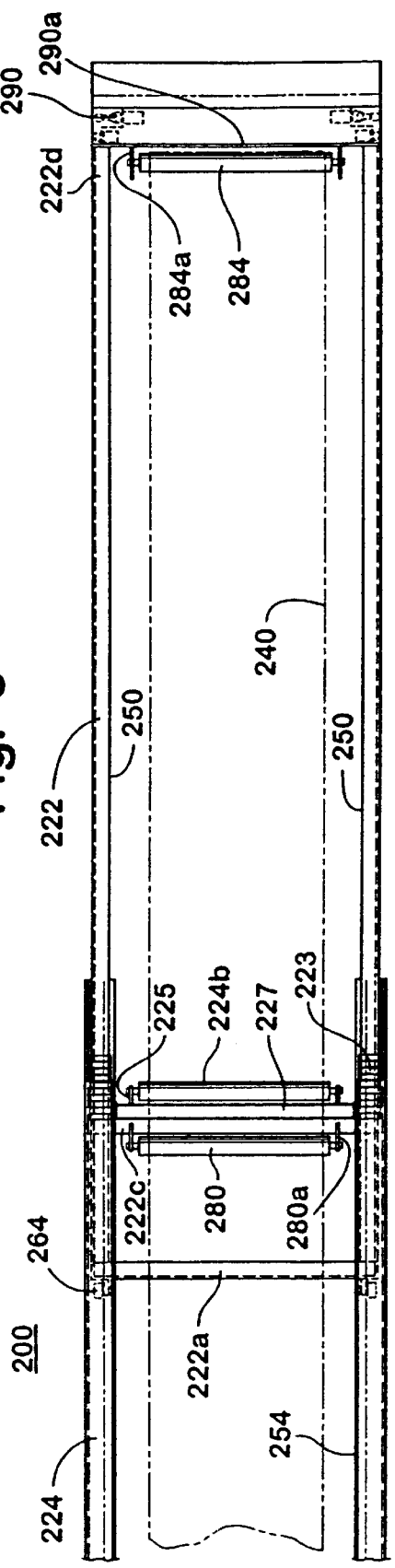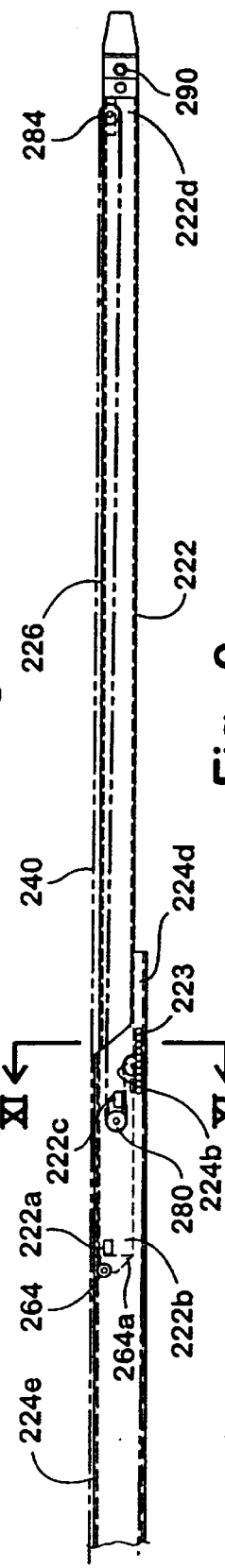

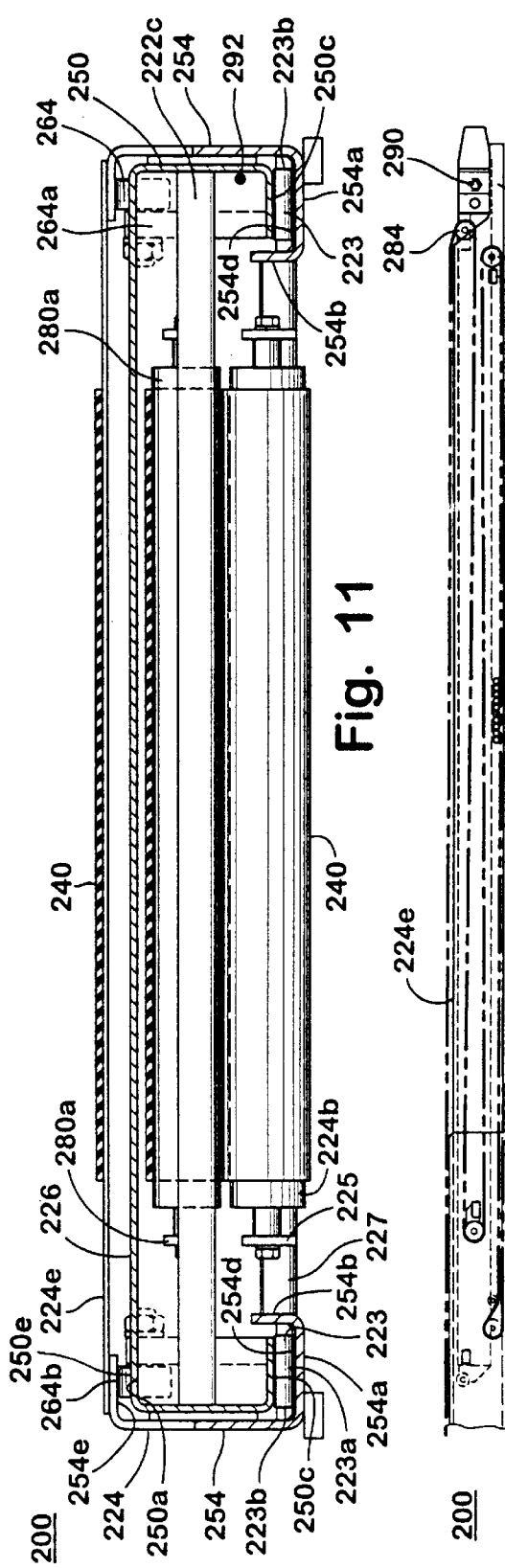
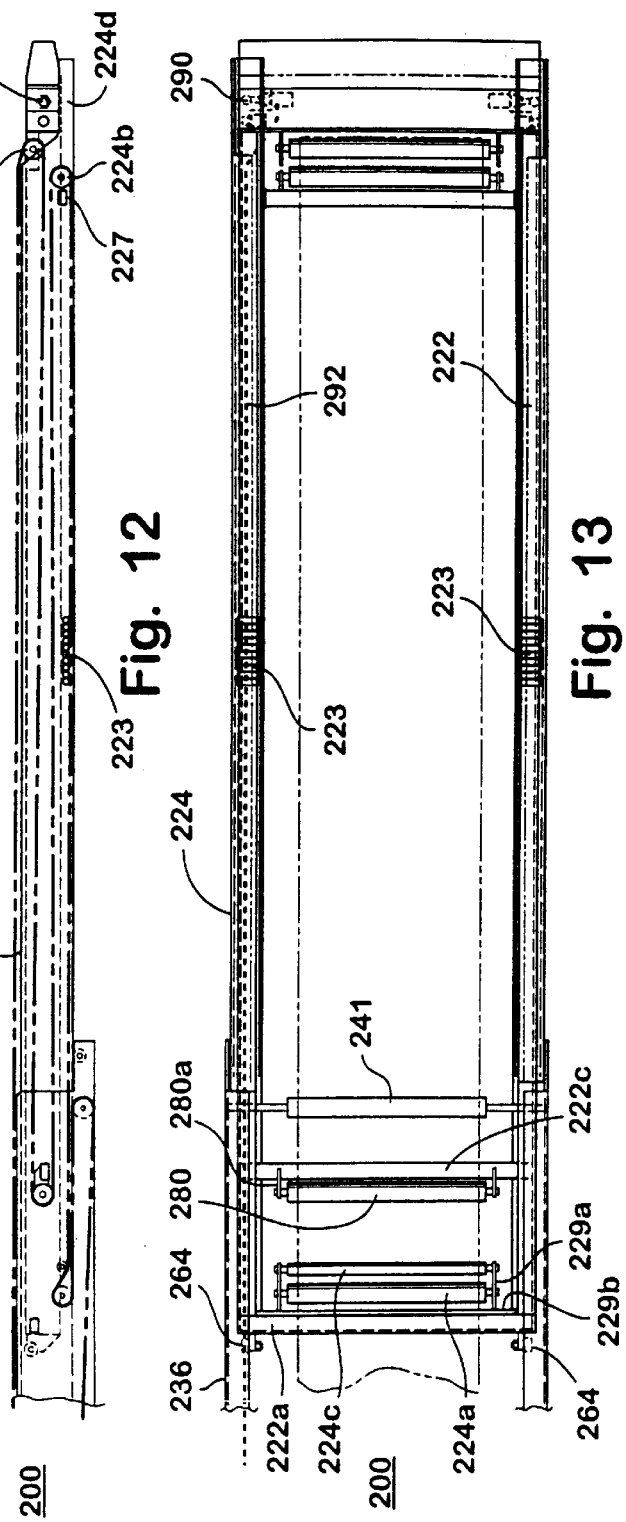

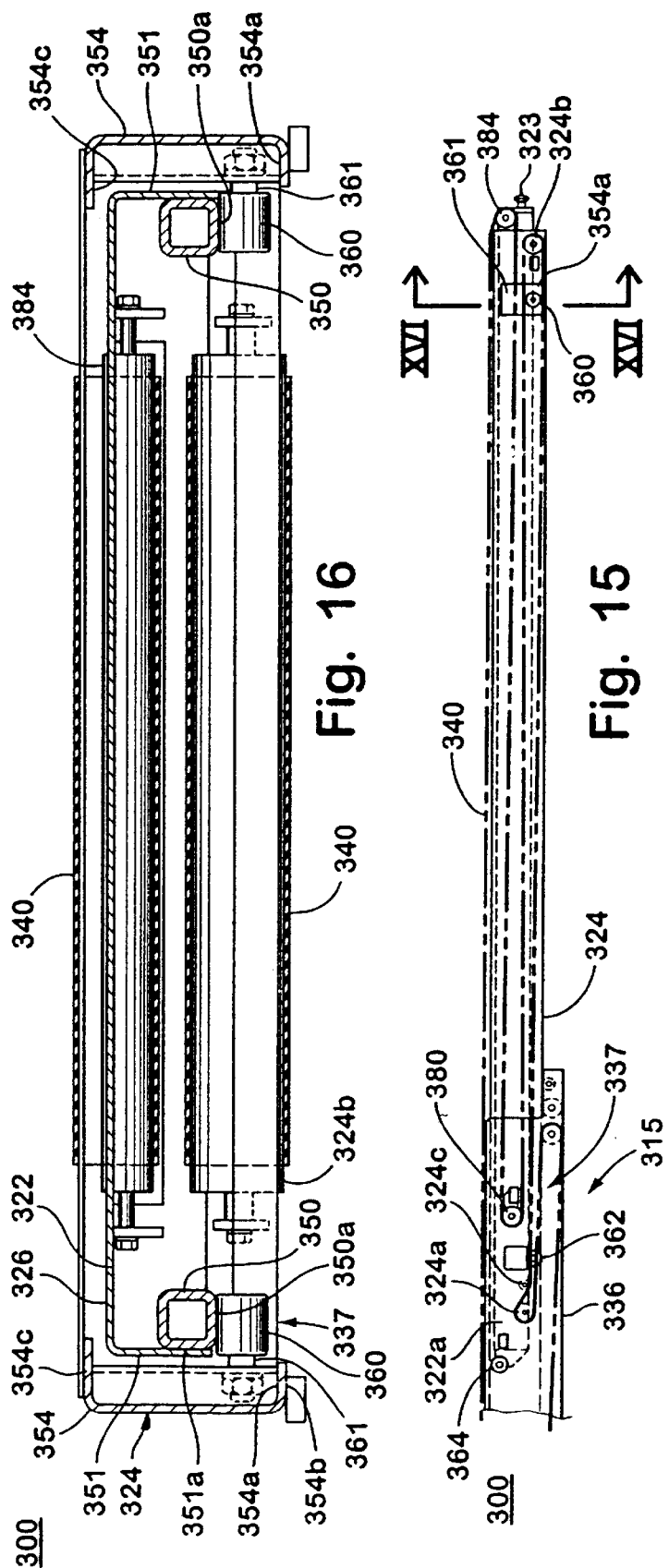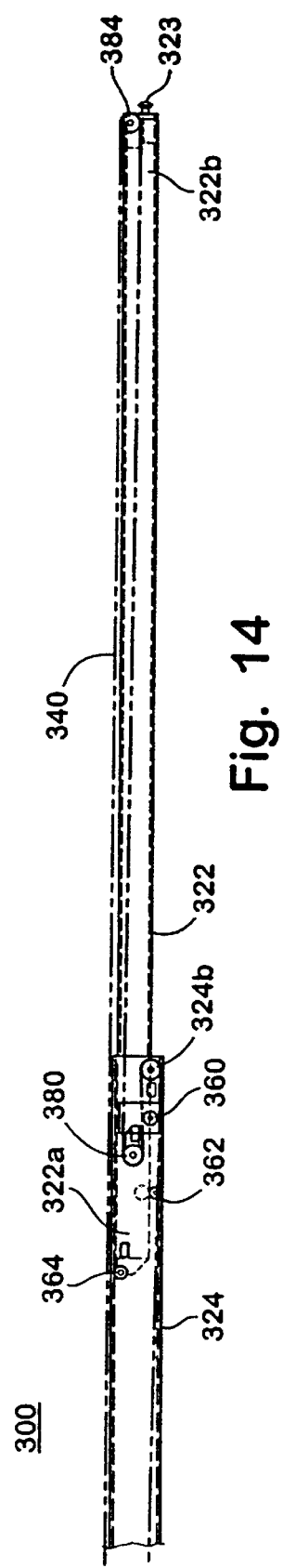

EXTENDABLE CONVEYOR WITH ADDITIONAL BOOM SECTION

BACKGROUND OF THE INVENTION

This invention relates generally to conveyors and, more particularly, to extendable conveyors for loading products into, or unloading products from, a truck trailer or the like.

Extendable conveyor units are typically implemented for loading and unloading truck trailers or the like in order to minimize the distance which the product being loaded or unloaded must be manually carried. Extendable conveyors in use today may have two, three or four extendable units, or extensions, in order to achieve the desired extended length for reaching a forward portion of the truck trailer, while still providing a relatively compact conveyor when it is retracted on the loading dock.

In order to provide an extendable conveyor which may retract into a relatively compact position on the loading dock, extendable conveyors typically include a base unit which is anchored to a warehouse or loading dock floor and one or more extendable units which are nested within the base unit and within each of the other inwardly positioned extendable units. The base unit and the extendable units may include horizontal support channels in order to guide the outwardly positioned extendable units and to bear the cantilever loading of the extendable units as they extend therefrom. Because the extendable units are nested within one another, the number of extendable units are typically limited, since additional units would either excessively limit the width of the outermost unit or result in a conveyor which is taller and requires a greater amount of floor space.

Generally, it is desirable to maximize the ratio of the width of the conveyor belt to the overall width of the base unit, such that there is a minimal difference between the two dimensions. In order to provide a larger space on which to place the cargo being loaded or unloaded, it is also important to maximize the width of the conveyor belt and outer conveying surface. Because each extendable unit is nested within the other inwardly positioned units, the width of the outermost nested units will be less than the width of the base structure and the inner units. Accordingly, additional extensions may be excessively narrow and may not accommodate the cargo on their conveying surface. Although such a concern may be resolved by including wider inner units and a wider base unit to accommodate a wider outermost extension, this is also undesirable, since the greater width of the base unit interferes with the floor space of the warehouse.

An additional concern with increasing the number of extendable units of the conveyor is that each unit requires a substantial amount of vertical space within the next inwardly positioned unit. This further results in the conveying surface of the base structure being at a greater height in order to accommodate each additional extendable unit. Such a design may not be feasible, since the conveying surface may have to accommodate an already existing supply or take-away conveyor which is installed at the warehouse or loading dock.

It is also generally desirable to maximize the ratio of the fully extended conveyor to the retracted length of the conveyor, in order to minimize the intrusion of the conveyor in the warehouse when it is not in use, while still providing a maximum extended length to reach into the truck trailers. Accordingly, extendable conveyors with longer booms or extendable units may not be desirable, since such a design would also require substantially more floor space in its retracted position when the conveyor is not in use. The longer, retracted units would then interfere with floor space that is required for people or machinery to move about within the warehouse.

Other concerns arise with respect to existing extendable conveyors in that such conveyors may be unable to extend a desired length due to the implementation of longer delivery trucks or other restrictions which may prevent the trucks from backing all the way up to the dock on which the extendable conveyor is mounted. Extensions have been proposed which may be attachable to an existing two, three or four unit extendable conveyor in order to achieve a greater length without having to replace the entire conveyor. Some extensions may be mounted on an outermost end of the outer extendable unit in order to provide an additional length to the extendable conveyor. However, such extensions do not nest within the inwardly positioned units when retracted and may not retract completely with the extendable conveyor. Such extensions may thus adversely affect the floor space requirements for the conveyor in the warehouse. Furthermore, these proposed extensions require a separate power source to operate a separate drive system for driving a separate conveyor belt along the additional extension. These separate conveying belts are typically of a reduced width with respect to the conveying portions and belt of the existing conveyor in order to allow the additional unit to rest upon the existing conveyor.

Therefore, there is a need in the art for an extendable conveyor which may extend farther into a truck trailer, without adversely affecting the width of the conveying surface or the floor space taken up by the extendable conveyor when it is retracted. Furthermore, the overall height of the conveying surface of the base structure should not be affected, in order to implement the conveyor adjacent to already existing supply or take-away conveyors in place at the warehouse or loading dock. Furthermore, there should be provided the capability to retro fit existing extendable conveyors with extensions in a manner which does not require a narrower conveying surface and which retracts fully with respect to a base unit.

SUMMARY OF THE INVENTION

The present invention is intended to provide an extendable conveyor which may extend farther into a truck trailer or the like over previously proposed conveyors, without adversely affecting the floor space required for such a conveyor and the retracted length and/or width of the conveying surface of the conveyor.

According to an aspect of the present invention, an extendable conveyor for conveying articles comprises a base structure, at least one extendable unit adjustably positioned between a retracted position and an extended position relative to the base structure, an extendable boom at least partially nested within the extendable unit and a support system for the extendable boom. The extendable unit has an upper portion, at least a portion of which defines a first conveying surface. The extendable boom is adjustably positionable between a retracted and extended position relative to the extendable unit. The extendable boom defines a second conveying surface. The support system includes at least one forward support member and a cantilever support member. The cantilever support member engages the upper portion of the extendable unit to cantileverly support the extendable boom relative to the extendable unit. The forward support member engages and supports the extendable boom and allows a greater width of the second conveying surface relative to a width of the first conveying surface.

In one form, the extendable boom comprises a pair of side members which are insertable into the extendable unit and a conveying mechanism which is pivotally attached to a forward end of the side members and extends over top of the extendable units. The forward support member is rotatably attached to the extendable unit such that a lower surface of the side members engages the forward support member for rolling contact therewith.

In another form, the extendable boom nests substantially within the forward extendable unit. The forward support members comprise a roller carriage which provides rolling engagement between a lower track along opposite sidewalls of the forward extendable unit and a lower portion of a pair of opposite side members of the extendable boom. The roller carriage provides support for the extendable boom relative to the forward extendable unit by moving forwardly along the forward extendable unit as the extendable boom is extended and rearwardly along the forward extendable unit as the extendable boom is retracted.

According to another aspect of the present invention, an extendable conveyor for conveying articles comprises a base structure, at least one extendable unit adjustably positioned between a retracted position and an extended position relative to the base structure and an extendable boom which is at least partially nested within the extendable unit. The extendable boom is adjustably positioned between a retracted position and an extended position relative to the extendable unit. The extendable unit has a first conveying surface which has a first width. The extendable boom is operable to extend outwardly from the extendable unit such that the extendable boom is cantileverly supported by the extendable unit. The extendable boom has a second conveying surface which has a second width. The second width is at least as great as the first width of the first conveying surface.

According to yet another aspect of the present invention, an extendable conveyor comprises a base structure, at least one extendable unit adjustably positioned between a retracted position and an extended position relative to the base structure, an extendable boom which extends and retracts within the extendable unit and a support system for the extendable boom. The extendable unit has a first conveying surface and the extendable boom has a second conveying surface. The support system includes a cantilever support roller and a roller carriage. The roller carriage includes at least one roller which is operable to roll relative to the extendable unit and the extendable boom such that the roller carriage moves outwardly relative to the extendable unit as the extendable boom moves outwardly relative to the roller carriage and the extendable unit. The extendable boom moves approximately twice the distance that the roller carriage moves relative to the extendable unit.

These and other objects, advantages, purposes and features of this invention will become apparent upon review of the following specification in conjunction with the drawings.

BRIEF DESCRIPTION OF THE DRAWINGS

FIG. 4 is the same enlarged view of FIG. 3 when the conveyor is in its fully extended position;

FIG. 5 is a top plan view of the conveyor of FIG. 4;

FIG. 8 is a partial side elevation of another embodiment of the present invention in an extended position;

FIG. 9 is an enlarged view of the area designated IX in FIG. 8;

FIG. 10 is a top plan view of the conveyor in FIG. 9;

FIG. 11 is a sectional view taken along the line XI—XI in FIG. 9;

FIG. 12 is the same view as FIG. 9, with the outer extension in a retracted position;

FIG. 13 is a top plan view of the conveyor in FIG. 12;

FIG. 14 is a partial side elevation of another embodiment of the present invention in an extended position;

FIG. 15 is the same view as FIG. 14, with the outer extension in a retracted position; and FIG. 16 is a sectional view taken along the line XVI—XVI in FIG. 15.

DESCRIPTION OF THE PREFERRED EMBODIMENTS

Figure 1:
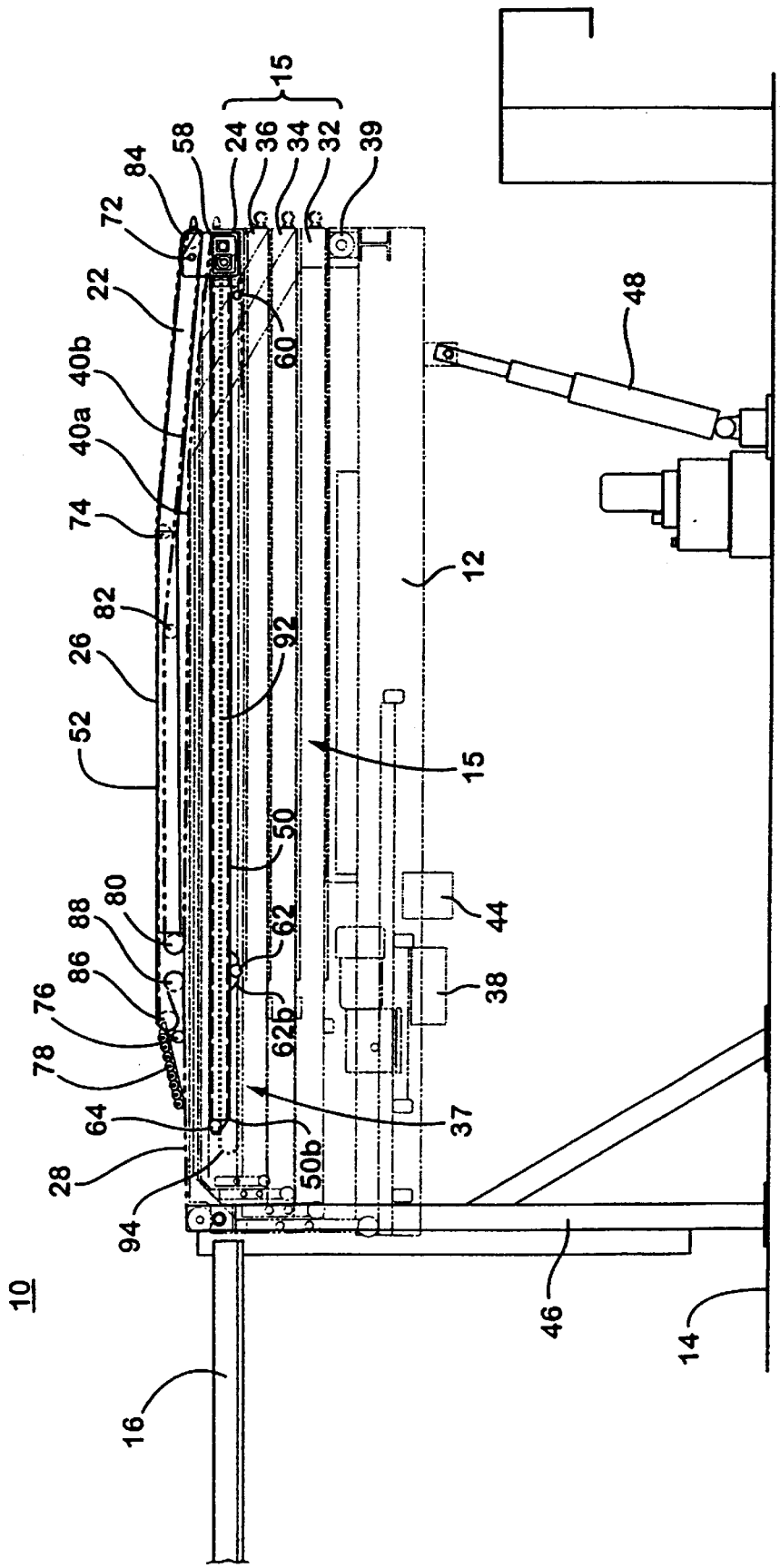
FIG. 1 is a side elevation of an extendable conveyor according to an aspect of the present invention in a fully retracted position.
Figure 2:
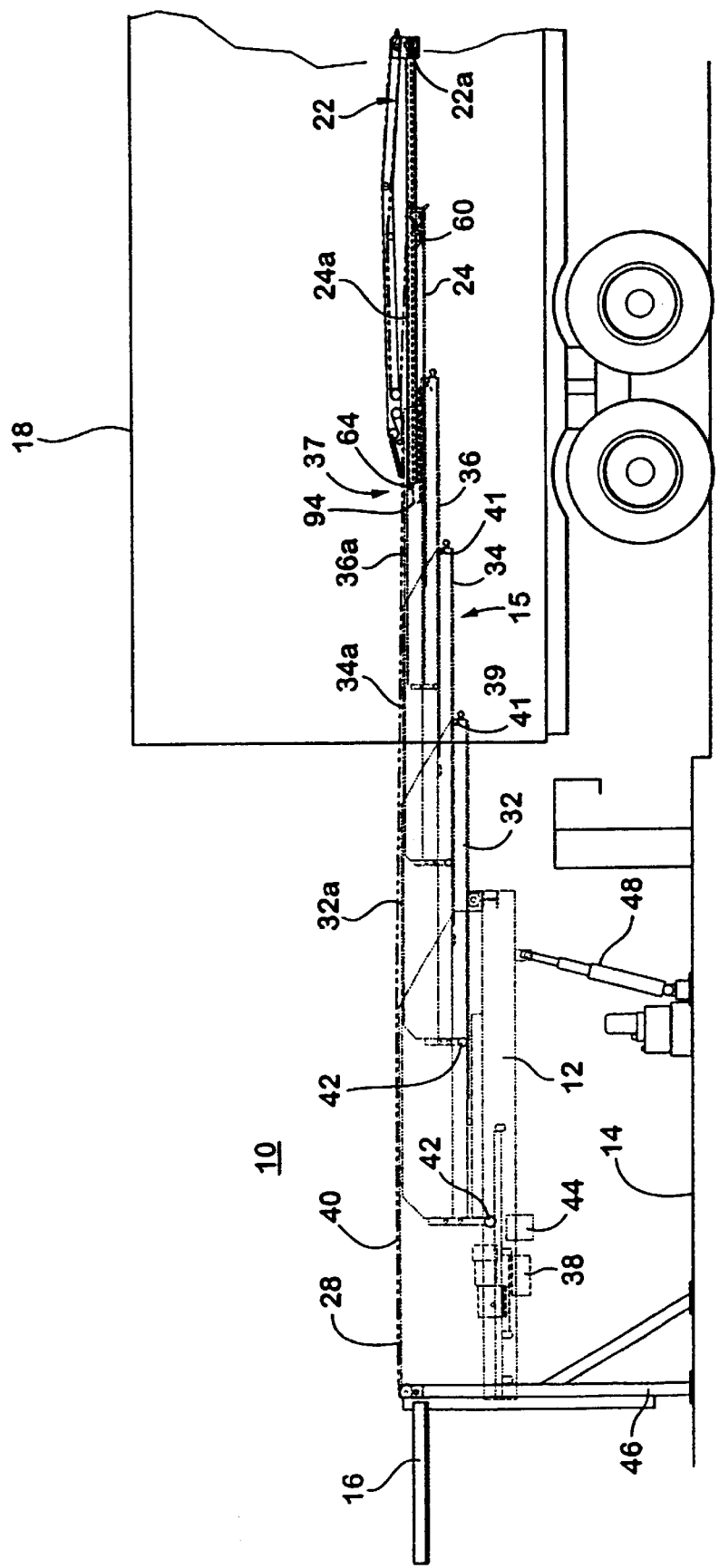
FIG. 2 is the same side elevation as that in FIG. 1, with the extendable conveyor in a partially extended position.

Referring now specifically to the drawings, and the illustrative embodiments depicted herein, an extendable conveyor 10 is supported on a base unit 12, which may be anchored to a floor 14 of a warehouse or the like and may be adjacent to a supply or take-away conveyor 16 (FIG. 1). The adjustable conveyor 10 includes a plurality of extendable sections or units 15 and an outermost additional unit or boom 22, which are extendable outwardly or forwardly from base unit 12 for extending into a truck trailer 18 or the like to load and unload products into and out from truck trailer 18 (FIG. 2). As used herein, unless otherwise noted, the terms outwardly and forwardly are used to describe the direction which the extendable units 15 extend from the base unit, while the terms inwardly and rearwardly are used to describe the direction of travel of the extendable units as they are retracted toward the base unit. Preferably, base unit 12 and extendable units 15 are of the type disclosed in commonly assigned U.S. Pat. No. 5,351,809 issued to Gilmore et al. and U.S. Pat. No. 5,423,413 issued to Gilmore, the disclosures of which are hereby incorporated herein by reference. Extendable conveyor 10 may include one, two, three, four or more extendable units 15. For example, extendable conveyor 10 may include four extendable units 24, 36, 34, and 32, and base unit 12 as shown in FIGS. 1 and 2, which define boom, or additional extension, 22 engages the outer nested extendable unit 24 and is supported and guided therewithin by a support system 37. Support system 37 includes a cantilever support roller 64 and a forward or outer support roller 60 on each side of extendable boom 22 to support extendable boom 22 as it is extended and retracted relative to outer extendable unit 24. Extendable boom 22 further includes a conveying portion 52, which may overlap or rest upon one or more of the conveying portions 24a, 36a, 34a, 32a and 28 of the extendable conveyor 10. Preferably, the width of conveying portion 52 is at a substantially similar width or may be wider than the width of the outermost nested unit 24. Although shown and described herein as being implemented on a conveyor having four extendable units and a base unit, clearly the extendable boom may be implemented on a conveyor having more or less units, without affecting the scope of the present invention.

Because the inner nested extendable units of extendable conveyor 10 are described in the Gilmore '809 and '413 patents, a detailed discussion of the extendable units will not be repeated herein. Suffice it to say, extendable conveyor 10 preferably comprises two or more extendable units. As shown in FIGS. 1 and 2, extendable conveyor 10 may comprise a rearward or inner or first extendable unit 32, a second extendable unit 34, a third extendable unit 36 and a fourth or forward or outer extendable unit 24. Each of the extendable units 24, 36, 34 and 32 are nested within the next inwardly positioned unit and extend and retract in a known fashion by a drive motor 38 and a plurality of chains and sprockets or pulleys (not shown). Preferably, each extendable unit is extendable and retractable at twice the rate as the next inwardly positioned unit, as is known in the art. As each extendable unit extends outwardly from the next inwardly positioned unit, a cantilever support roller 42 rolls along and engages the next inwardly positioned unit in order to provide a cantilever support to each extending unit, while forward support rollers 39 support a forward end of each unit.

A continuous conveyor belt 40 is routed around multiple belt rollers 41 positioned at each end of each extendable unit 24, 36, 34 and 32, and is driven by a drive motor 44. Drive motor 44 functions to move the endless conveyor belt 40 along the conveying portions 24a, 36a, 34a, 32a and 28 of the extendable units 15 and base 12, respectively, in order to move products along the extendable units between the truck trailer 18 and take-away or supply conveyor 16. As is known in the art, the belt routing allows belt 40 to be driven by motor 44 when extendable conveyor 10 is either fully retracted (FIG. 1) or partially or fully extended, while retaining the proper tension on belt 40.

Base unit 12 may be supported above floor 14 by a rearward support structure 46 and a forward adjustable vertical support 48, which functions to raise and lower the conveyor as it extends outward into truck trailer 18 or the like. An electrical cable (not shown) may be interconnected to drive motors 38 and 44 and adjustable vertical support 48 and routed through the extendable units toward an outer or forward end of extendable unit 24 for connection to a control panel or device, as discussed below. Preferably, the cable is routed around separate pulleys to maintain proper tension in the cable, as is disclosed in U.S. Patent 5,423,413, referenced above.

Figure 3:
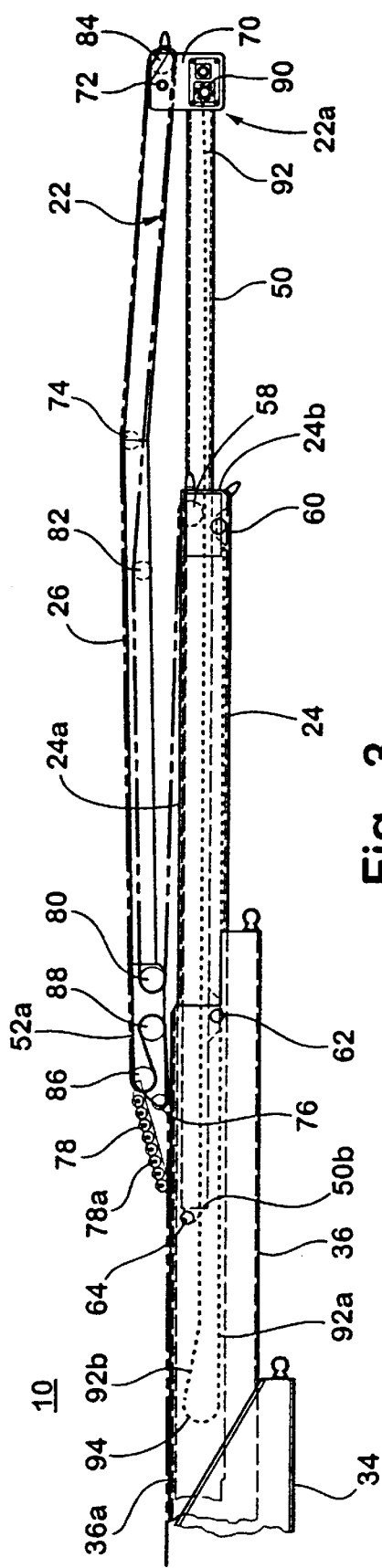
FIG. 3 is an enlarged view of the area designated III in FIG. 2.
Figure 6:
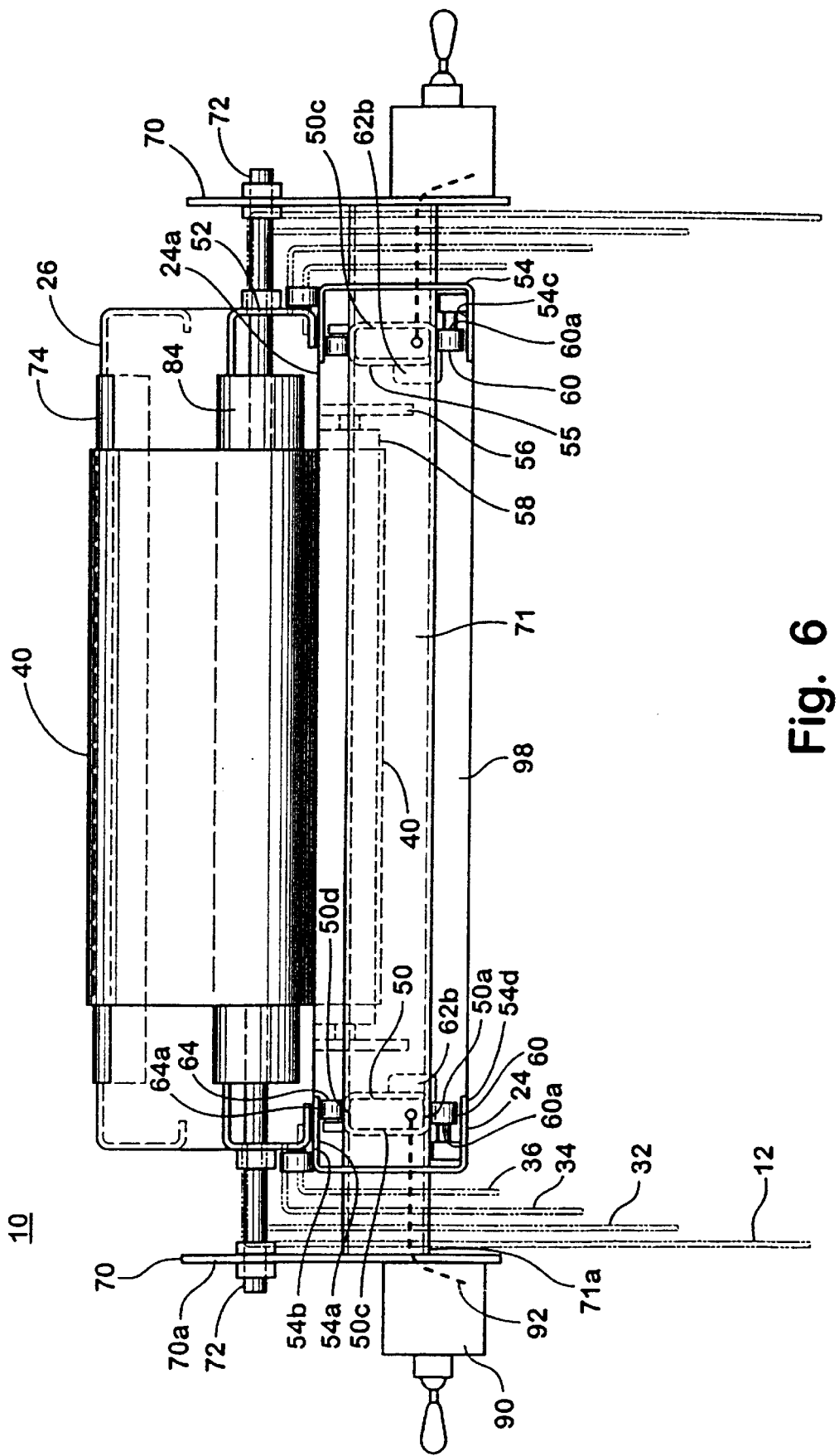
FIG. 6 is an end view along the line VI—VI in FIG. 5.

Each extendable unit 24, 36, 34, and 32 is nested within the next inwardly positioned unit or base structure 12 (FIG. 6). Outer unit 24 is defined by a pair of side walls 54 interconnected by an upper conveying portion 24a, such as a slider bed or other conveying surface. Each side wall 54 is substantially C-shaped, having an upper, laterally inwardly turned portion 54b and a lower, laterally inwardly turned portion 54d. Side walls 54 are further interconnected at their outer ends by an end plate 98. An outer belt roller 58 is rotatably mounted between a pair of brackets 56, which are secured to end plate 98 and extend rearwardly therefrom. Belt roller 58 is rotatably mounted at outer end 24b of unit 24 to reverse belt 40 herearound as it is guided toward an inner roller 80 of extendable boom 22 (FIGS. 3 and 4). Preferably, a pair of apertures 55 are formed in end plate 98 for insertion of a pair of side members 50 of boom 22 into extendable unit 24 between brackets 56 and their respective side walls 54.

Outer boom 22 includes a pair of opposite side members or support beams 50, which insert into a space defined by outer extendable unit 24, and an upper conveying portion 52. Conveying portion 52 includes a pair of opposite side walls 52a which are interconnected along an upper end to define an upper conveying surface 26. Conveying portion 52 is preferably pivotally interconnected to outer end 22a of extendable boom 22 and extends inwardly over an upper surface of one or more of the extendable units 24, 36, 34 and 32 as extendable conveyor 10 is moved between its retracted and extended positions. A pair of rollers 76 may be included at an inward end 52a of conveying portion 52 to engage the conveying portions 24a, 36a, 34a, 32a and 28 of the extendable conveyors 15 and base 12 as boom 22 is extended and retracted relative to extendable conveyor 10.

Side members 50 of extendable boom 22 are preferably interconnected at their outer end by a cross beam 71 to provide lateral stability to the boom 22. Outer or forward end 22a of outer boom 22 is preferably defined by a pair of side plates 70, each of which are secured to a laterally outer end 71a of cross beam 71. Side plates 70 extend upwardly from their connection to cross beam 71, and are further inter-connected at their upper ends 70a by a pivot axle 72 on which conveying portion 52 is preferably pivotally secured. A control panel 90 is preferably positioned on one or both of the side plates 70 to allow an operator to actuate drive motor 38 to extend or retract and to raise or lower conveyor 10 and to actuate belt drive motor 44 from within the truck trailer. Control panel 90 may further function to control a drive motor 62b to drive or rotate an inner support roller 62, thereby extending or retracting extendable boom 22 relative to extendable unit 24. Control panel 90 may include a user operable lever to control the amount of extension as well as the height of the conveyor 10. Preferably, the lever is a joystick 90a, but may be other controls, such as buttons or switches, without affecting the scope of the present invention.

Extendable boom 22 preferably further includes an electrical cable 92 which interconnects control panel 90 with the conventional cable of extendable conveyor 10. Because extendable boom 22 extends outwardly and retracts inwardly with respect to the next inwardly positioned unit 24, electrical cable 92 must be of a length great enough to allow for the relative movement between extension 22 and extendable unit 24. Preferably, electrical cable 92 is routed within a cable track or the like, which may be unidirectionally flexible such that the cable forms a reversing loop 94, as shown in FIGS. 1, 2 and 3. Accordingly, a lower portion 92a of cable 92 will remain substantially flat along extendable unit 24 while an upper portion 92b rests substantially along and over top of lower portion 92a as side members 50 are extended and retracted within extendable unit 24. Such cable track is well known in the art and is commercially available from known sources. Because the track is unidirectionally flexible, the cable 92 will remain in its lateral orientation along the sideward portion of extendable unit 24. This prevents cable 92 from becoming entangled with support rollers 62 and/or 64 or belt 40 as extendable conveyor 10 is extended or retracted, and further eliminates the need for an additional cable pulley or roller on extendable unit 24. Electrical cable 92 may be routed within or along side one of the side members 50 to remain separated from belt 40 as cable 92 is routed toward control panel 90.

As extendable boom 22 is extended and retracted relative to extendable unit 24, support system 37 facilitates smooth translation of extendable boom 22, while cantileverly supporting the boom 22 as it extends outwardly from extendable unit 24. Cantilever support roller 64 of support system 37 is rotatably mounted to a bracket 65 which extends rearwardly from inner or rearward end 50b of each side member 50. Cantilever roller 64 rolls along a lower surface 54a of upper laterally inwardly turned portion 54b of side members 54. As boom 22 extends outwardly such that a majority of its weight is forward of support roller 60, upper portion 54b prevents upward motion of cantilever roller 64 and rearward end 50b of support members 50, thereby providing cantilevered support of outer extendable boom 22 as it extends outwardly from extendable unit 24. As shown in FIGS. 1–4 and 6, an upper portion 64a of cantilever support roller 64 extends upwardly and slightly above a horizontal plane defined by an upper surface 50d of side members 50. Cantilever support roller 64 extends a minimal amount above upper surface 50d to provide rolling engagement with surface 54a of sides 54, while allowing extendable boom 22 to be of a desired height for support and strength without adversely affecting the corresponding height requirements for extendable unit 24. Although shown and described as a pair of rollers, cantilever support 64 may otherwise be wheels, cam followers or skid plates, without affecting the scope of the present invention.

Outer support roller 60 of support system 37 is preferably rotatably mounted near an outer end 54e of each side 54 of extendable unit 24 and positioned beneath side members 50 in order to guide and support side members 50 as they extend and retract within extendable unit 24, as best shown in FIGS. 3, 4 and 6. Although shown as a single roller mounted to extendable unit 24, outer support roller 60 may be a movable roller carriage, which rolls between side members 50 of extendable boom 22 and sides 54 of extendable unit 24, as discussed below with respect to roller carriage 223 of extendable conveyor 200. Support system 37 may further include inner or rearward support roller 62, which is rotatably mounted to side members 50 along a lower surface 50a thereof. As side members 50 extend and retract within extendable unit 24, outer support rollers 60 are in rolling contact with underside 50a of side members 50, while inner support rollers 62 are in rolling contact with an upper surface 54c of lower inwardly turned portion 54d of sides 54 of extendable unit 24.

Preferably, inner and outer support rollers 62 and 60 are positioned directly beneath side members 50, such that a laterally outer side 62a and 60a of each is positioned substantially adjacent to or laterally inwardly from a vertical plane defined by a laterally outer side 50c of side members 50. Because only a minimum space is required laterally outwardly from side members 50, this allows side members 50 of extendable boom 22 to nest within outer extendable unit 24, while being substantially laterally separated to provide a wider opening therebetween. This further allows greater clearance between side members 50 for conveyor belt 40, such that the addition of extendable boom 22 has a minimal affect on the range of widths of conveyor belt 40 which may be implemented. Because a wider belt may be implemented without requiring additional width of extendable unit 24 and thus of the other units and base unit 12 of conveyor 10, the present invention facilitates maximizing the ratio of the conveyor belt width to the width of the overall extendable conveyor.

Preferably, inner support roller 62 is driven by a motor 62b, such that outer boom 22 is extendable and/or retractable independent of movement by extendable units 24, 36, 34 and 32. However, extendable boom 22 may be extended and retracted in a similar manner as the extendable units 24, 36, 34 and 32, as is known in the art. Alternatively, extendable attachment 22 may be manually movable relative to the next outermost extendable unit 24, without affecting the scope of the present invention.

As best shown in FIGS. 4 and 5, conveying portion 52 of extendable boom or attachment 22 extends rearwardly and upwardly from pivot axis 72 and preferably bends at a belt roller 74 to extend further inwardly and substantially horizontally or slightly downwardly toward a conveying surface 24a, 36a, 34a, 32a or 28 of one of the extendable units 24, 36, 34 or 32 or base unit 12, respectively. One or more support rollers 76 may be rotatably mounted to inward end 52a of conveying portion 52 and spaced laterally apart for rolling contact with conveying surfaces 24a, 36a, 34a, 32a and 28 on either side of conveyor belt 40 as the extendable units of conveyor 10 are extended and retracted. Preferably, a conveying ramp 78 may be implemented to interconnect an inward portion 26a of conveying surface 26 to one of the conveying surfaces of the extendable units and/or base unit 12. Ramp 78 is preferably formed with a plurality of laterally extending conveying rollers 78a therealong, such that as a package or product is conveyed inwardly along conveying surface 26 of extension 22, the package may roll down ramp 78 due to gravitational forces alone and onto the next conveying surface of extendable conveyor 10. However, it is further envisioned that a separately driven ramp assembly (not shown) or the like may be implemented at inward end 26a of conveying surface 26, such that extendable conveyor 10 may be utilized as a loading conveyor as well as an unloading conveyor. The driven ramp may comprise a belt conveyor or powered rollers, or any other known conveying means, without affecting the scope of the present invention. Packages or product may then be conveyed outwardly along conveyor belt 40 on conveying surfaces 28, 32a, 34a, 36a and 24a, and up the motorized ramp and onto conveying surface 26 of extendable boom 22.

Preferably, extendable boom 22 shares a common endless conveyor belt 40 with base unit 12 and extendable units 24, 36, 34 and 32. As best shown in FIGS. 3 and 4, conveyor belt 40 may be reeved around belt roller 58 of outer extendable unit 24 and further reeved around a belt roller 80 at inward end 52a of conveying portion 52 of extendable boom 22, such that belt 40 reverses around roller 80 and extends outwardly from belt roller 80 toward outer end 22a of extension 22. Belt 40 may then be guided by a guide roller 82 to provide a curve in belt 40 such that belt 40 extends downwardly and outwardly toward an outer belt roller 84. By guiding belt 40 around guide roller 82, clearance is provided between a belt section (generally referenced as 40a in FIG. 1) of belt 40 between rollers 58 and 80 and a belt section (generally referenced as 40b in FIG. 1) of belt 40 between guide roller 82 and outer roller 84 when extendable boom 22 is retracted.

Outer belt roller 84 is preferably positioned outwardly of pivot axis 72 of conveying portion 52. Conveyor belt 40 reverses direction around outer roller 84 and travels inwardly along conveying surface 26 of extendable boom 22 and is further guided around guide roller 74. Guide roller 74 facilitates curving of belt 40 substantially horizontally and slightly downwardly toward extendable conveyor 10, such that inward portion 52a of conveying portion 52 is substantially horizontal over conveying surface or portion 28 of base 12 when extendable boom 22 is retracted. At inward end 52a of conveying portion 52, conveyor belt 40 is curved in an S-shaped manner about a pair of belt rollers 86 and 88, such that belt 40 is guided inwardly from roller 88 along a substantially horizontal path corresponding with the conveying portion or surface 24a, 36a, 34a, 32a, or 28 of the appropriate extendable unit or base unit upon which conveying portion 52 rests. The level of belt 40 as it travels rearward from roller 88 is adjusted to the appropriate conveying surface, because conveying portion 52 pivots as rollers 76 engage the conveying surfaces of the extendable unit or the base unit, which are at slightly different heights. Accordingly, the continuous conveyor belt 40 is movable to convey products or packages along each of the conveying portions of extendable conveyor 10 and provides a smooth transition to the next conveying portion regardless of the degree of extension or retraction of each individual extendable unit or extendable attachment of conveyor 10, since belt 40 remains taught in all orientations of extendable conveyor 10.

As shown in FIG. 1, when extendable conveyor 10 is in its fully retracted position on base unit 12, conveying portion 52 of extendable boom 22 is pivoted about pivot axis 72 to its upward most position such that rollers 76 are on top of conveying surface 28 of base unit 12. Side members 50 are retracted within extendable unit 24 such that the reversing loop or bend 94 of electrical cable 92 is immediately inward of inward end 50b of side members 50. As extendable conveyor 10 is extended outwardly by motorized drive 38, outermost extendable boom 22 may be similarly driven outwardly, or may be driven by motor 62b and rollers 62. Rollers 76 correspondingly move outwardly with boom 22 and roll along conveying surface 28 of base unit 12, onto conveying surface 32a of inner extendable unit 32, further onto conveying surface 34a of extendable unit 34, onto conveying surface 36a of extendable unit 36 and finally onto conveying surface 24a of extendable unit 24 as extendable conveyor 10 is extended toward its fully extended position shown in FIG. 4. As extendable conveyor 10 extends further outwardly, such that rollers 76 engage the next lower conveying surface, conveying portion 52 pivots downwardly about pivot pin 72 in order to maintain rollers 76 and ramp 78 in rolling contact with each conveying surface.

Figure 7:
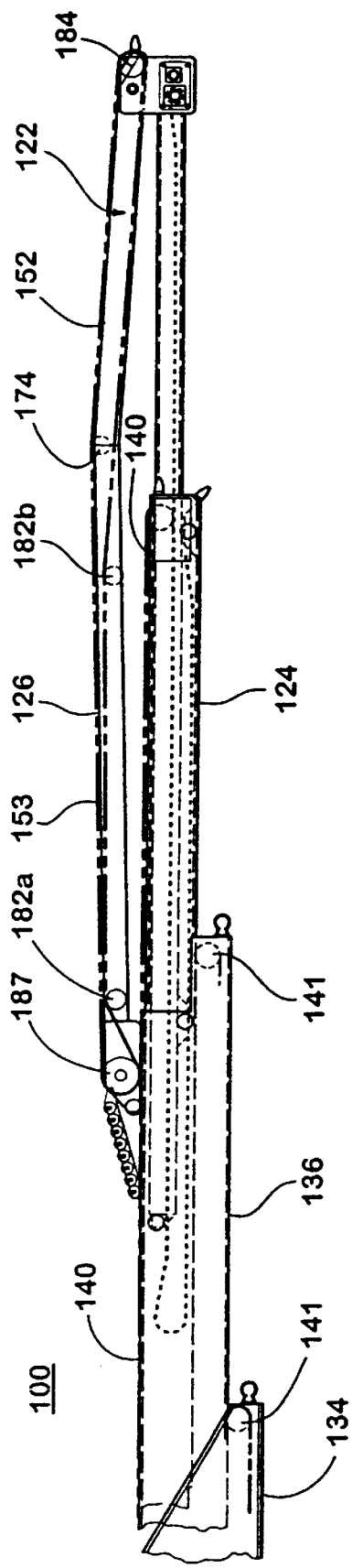
FIG. 7 is the same view as FIG. 3 of an alternate embodiment of the present invention in a partially extended position.

Referring now to FIG. 7, an alternate embodiment is shown of an extendable conveyor 100, which also includes an outermost extendable boom 122 extending outwardly from an outer conventional extendable unit 124. Extendable boom 122 is substantially similar to extendable, boom 22 discussed above but includes a conveying portion 152 which has a separate endless or continuous conveyor belt 153 routed thereon. Continuous belt 153 is preferably driven by a motorized pulley 187 which drives belt 153 along a pair of guide pulleys 182a and 182b, around an outer belt roller 184 and back over an upper guide roller 174 and along a conveying surface 126 of extendable boom 122. A separate endless conveyor belt 140 is routed and reeved about a plurality of pulleys and guide rollers 141 along and within a base unit (not shown) and one or more extendable units, generally represented as extendable units 124, 136 and 134 in FIG. 7. Endless belt 140 is routed and driven in a conventional manner along each of the extendable units of extendable conveyor 100. Extendable boom 122 facilitates minimal intrusion by the addition of boom 122 onto an existing extendable conveyor, since the existing endless conveyor belt need not be lengthened, or have an extension spliced therein, to be further routed around the rollers of the additional boom 122.

Although shown and described above as an extendable conveyor having an additional outer boom associated therewith, the scope of the present invention includes providing an aftermarket extension which may be installed within an existing two, three or four unit extendable conveyor. The additional extendable boom or attachment 22 or 122 may be implemented with an existing conveyor due to its minimal space requirements within the outer extendable unit of the conventional conveyor. The attachment requires minimal space within the outer extendable unit due to the insertion of the pair of support members 50 and cantilever rollers 64 within the outer extendable unit, while the conveying portion extends rearwardly above and outside of the outer extendable unit. In order to facilitate implementation of the extendable boom within the existing conveyor, a conventional control panel (not shown), which may be initially positioned along an outer end of an outermost extendable unit, may be removed to provide clearance between the mounting brackets 56 of the forward belt roller 58 and the side walls 54 of the extendable unit. Openings or apertures 55 may be formed in end plate 98 (FIG. 6) if necessary to allow side members 50 to be inserted therethrough and into the space provided within the outer extendable unit. A pair of outer support rollers 60 may be rotatably mounted at the outer end of the outer extendable unit, while a pair of cantilever support rollers 64 may be provided on the side members of the extendable boom to support the boom as it extends and retracts within the outer extendable unit.

The electrical cable 92 may then be connected in a conventional manner to the existing cable along the outer extendable unit to provide power and control capabilities to the control panel 90 on the extendable attachment. Preferably, the cable 92 is routed along the side members of the extendable boom and reverses back toward the outer end of the outer extendable unit within a unidirectionally flexible section of cable track. An additional section of conveyor belt may be added or spliced to a continuous conveyor belt associated with the existing conveyor, such that the common continuous conveyor belt may be long enough to also route within the conveying portion 52, as discussed above. Alternately, however, the existing endless or continuous belt 140 may continue to be utilized, while a separate endless belt is provided along the extendable attachment, as discussed above with respect to separate belt 153 of conveying portion 152 of extension 122. Preferably, a separate drive motor 62b and rollers 62 may be implemented along with the additional extension to drive rollers 62 in order to control extension and retraction of the extension within the outer extendable unit. Alternately, the additional extension may then be manually retracted and extended within the outer extendable unit, or may further include an interconnection with the drive system associated with the existing conveyor.

Therefore, the above embodiment of the present invention provides an additional outermost boom or extension for a conventional extendable conveyor which does not adversely affect the width of the outermost conveying surface or the height of the conveying surface associated with the base unit. Because the conveying portion associated with the extendable attachment does not nest within the adjacent extendable unit, the width of the conveying portion may be equal to or greater than the conveying surface associated with the inwardly adjacent extendable unit. Furthermore, because only the support members are nested within the inwardly adjacent adjustable unit, the present invention also does not adversely affect the vertical space required for the inwardly adjacent extendable unit. This further results in a conveyor assembly which has an uppermost conveying surface along its base unit that is not adversely affected by the addition of the extendable attachment, which further allows implementation of the present invention without requiring additional modifications to the conventional supply and/or take-away conveyor associated with the loading dock or warehouse.

Referring now to FIGS. 8–13, an alternate embodiment of the present invention is shown for an extendable conveyor 200. Extendable conveyor 200 includes a base unit (not shown, but may be similar to base unit 12), and at least one extendable unit 215 which is extendable and retractable relative to the base unit. Extendable conveyor 200 is shown with two extendable units 224 and 236 and a forward or outer extendable boom 222. The inner or rearward extendable units 215 and the base unit are preferably substantially similar to the extendable units 36, 34, 32, and base 12 described above with respect to extendable conveyor 10. Accordingly, no further discussion of the components and functionality of these units will be repeated herein.

Outer or forward extendable unit 224 is likewise preferably similar to the extendable unit 24 discussed above. However, extendable unit 224 is modified in order to allow extendable boom 222 and its conveying surface 226 to nest within outer extendable unit 224. As best shown in FIG. 8, outer extendable unit 224 includes belt rollers 224a and 224b at opposite ends thereof and a belt guide roller 224c positioned forwardly of roller 224a. As shown in FIGS. 10 and 11, forward roller 224b of extendable unit 224 is rotatably mounted between a pair of brackets 225 extending forwardly from a forward cross member 227 secured between side members 254 of extendable unit 224. Belt rollers 224a and 224c may likewise be rotatably mounted between a pair of brackets 229a extending forwardly from a rearward cross member 229b at a rearward end of extendable unit 224 (FIG. 13). A continuous belt 240 is routed around conventional rollers 241 on the inner extendable units and the base unit and around rollers 224a and 224b of extendable unit 224, and further about a pair of rollers 280 and 284 on extendable boom 222, such that proper tension is maintained in the belt regardless of the degree of extension of the extendable units and boom. The additional guide roller 224c is positioned forwardly or outwardly of inner belt roller 224a of extendable boom 224, such that continuous belt 240 is directed downwardly in front of roller 224a as it travels toward a forward end 224d of extendable unit 224. This results in belt 240 traveling along a lower portion of extendable unit 224 toward forward belt roller 224b, in order to provide clearance within extendable unit 224 for retraction of extendable boom 222 therewithin.

As shown in FIG. 11, side members 254 of forward extendable unit 224 are also similar to side members 54 of extendable unit 24, discussed above, in that they are substantially C-shaped in cross section. However, a lower, inwardly turned portion 254a of side members 254 includes a laterally inward section 254b which is preferably upwardly turned such that a substantially U-shaped trough or track is formed along lower portion 254a of side members 254. Cross members 227 and 229b are interconnected between inward sections 254b on each side 254, in order to provide clearance within and above track portion 254a for side members 250 of boom 222, as discussed below. Preferably, side members 254 are tapered at their outer end 254e such that only the U-shaped track extends substantially beyond the location of forward roller 224b. This provides clearance for a control panel 290 on extendable boom 222 when extendable boom 222 is fully retracted within forward extendable unit 224, as seen in FIG. 12.

Extendable boom 222 comprises a pair of side members 250 which are interconnected at their upper ends 250a such as by an upper conveying portion 226 which supports conveying belt 240. An inner or rearward cross member 222a may extend laterally between side members 250 to provide lateral rigidity to extendable boom 222 at a rearward end 222b thereof. A second laterally extending cross beam 222c may extend between side members 250 and may be positioned forwardly of cross member 222a. Rearward conveyor belt roller 280 is rotatably mounted to a pair of brackets 280a which are fixedly secured along cross member 222c and extending rearwardly therefrom, as best shown in FIGS. 10 and 13.

At an outer end 222d of extendable boom 222, a forward or outer conveyor roller 284 is rotatably mounted to a pair of mounting brackets 284a, which extend rearwardly from a forward cross member assembly 290a. One or more control panels 290 may be mounted on either or both sides of cross member 290a to allow an operator of extendable conveyor 200 to extend, retract, raise and/or lower the extendable units and extendable boom 222 and to further facilitate operation of conveyor belt 240 from outer end 222d of extendable boom 222.

As best shown in FIGS. 9 and 11, rearward belt roller 280 of extendable boom 222 is preferably positioned above the level of belt roller 224b of extendable unit 224, such that belt 240 is curved in a substantially S-shaped curve as it is guided around rollers 224b and 280. An upper portion of the roller 280 is below conveying surface 226, such that conveyor belt 240 remains below conveying surface 226 of extendable boom 222 as conveyor belt 240 routes around rearward roller 280 toward forward end 222d of extendable boom 222. As belt 240 travels toward forward roller 284, belt 240 is guided slightly downwardly from rearward roller 280 and reverses direction around forward roller 284. Belt 240 then travels rearwardly toward the base unit above and along conveying surface 226 of extendable boom 222, the conveying portion or surface 224e of extendable unit 224, and the conveying portions of the inwardly positioned extendable units, if the respective units are at least partially extended from the base unit.

Similar to extendable conveyor 10 discussed above, extendable conveyor 200 includes a support system, shown generally at 237 in FIGS. 8, 9 and 12, for extendable boom 222. Support system 237 includes a cantilever support roller 264, which is rotatably mounted at an upper end of a rear or inner mounting bracket 264a positioned at inner or rearward end 222b of each side member 250 of extendable boom 222. Cantilever support roller 264 engages a lower surface 254e of side members 254 as extendable boom 222 is extended from extendable unit 224. As shown in FIGS. 9 and 11, an upper portion 264b of cantilever support roller 264 extends upwardly and slightly above a horizontal plane defined by an upper surface 250e of side members 250, similar to support roller 64 of extendable boom 22, discussed above. By providing a minimal height above the upper surface 250e of side members 250, extendable boom 222 may be of a desired height for support and durability, without adversely affecting the corresponding height requirements for the forward extendable unit 224.

Support system 237 further includes a support member 223, which is positioned vertically between side members 250 and the track or channel of lower portion 254a of side members 254 of extendable unit 224. Support member 223 is preferably a roller carriage 223, which preferably comprises multiple low profile rollers 223a, such as the eight rollers shown in FIGS. 8–13. Each of the rollers 223a includes a center pin 223b (FIG. 11) which may be rotatably interconnected with the other rollers 223a of roller carriage 223. As best shown in FIG. 11, roller carriage 223 rests within the U-shaped track along lower portion 254a of side members 254, such that roller carriage 223 may roll along the length of track portion 254a along side members 254 of extendable unit 224. Roller carriage 223 supports extendable boom 222 as extendable boom 222 is extended and retracted within extendable unit 224. A lower surface 250c of each side member 250 maintains rolling contact with each of the rollers 223a of roller carriage 223, while the rollers 223a further maintain rolling contact with an upper surface 254d of track 254a along each side 254. Preferably, each of the rollers 223a are coated with or formed from a rubberized or plastic or other traction enhancing material which freely rolls relative to side members 250 and track 254a, yet substantially precludes slipping between rollers 223a and either track 254a or side members 250. Because roller carriage 223 rolls relative to both extendable unit 224 and extendable boom 222, extendable boom 222 moves outwardly relative to roller carriage 223 as roller carriage 223 likewise moves outwardly relative to extendable unit 224. Accordingly, roller carriage 223 moves outwardly or forwardly along track 254a at half the rate at which extendable boom 222 is moved outwardly therefrom, which results in roller carriage 223 moving half the distance that extendable boom 222 may move relative to extendable unit 224. As shown in FIGS. 12 and 13, roller carriage thus is preferably positioned along track 254a at approximately a mid point or half-way point of extendable unit 224 when extendable boom 222 is fully retracted therewithin. As extendable boom 222 is extended from extendable unit 224, roller carriage 223 moves outwardly half the distance that extendable boom 222 moves, thereby moving substantially near to outer end 224d of extendable unit 224 when extendable boom 222 is fully extended therefrom, as shown in FIGS. 9 and 10.

When in its fully retracted position, extendable boom 222 is supported by and substantially balanced on roller carriage 223, since roller carriage is preferably positioned at or near the mid point of extendable boom 222. When extendable boom 222 extends outwardly from extendable unit 224, a greater percentage of weight of extendable boom 222 is shifted forwardly of roller carriage 223, such that an upper portion of cantilever roller 264 engages surface 254e of extendable unit 224, in order to cantileverly support extendable boom 222 and prevent downward movement of forward end 222d. Although extendable boom 222 is substantially balanced on roller carriage 223, it is envisioned that other support members may be implemented to prevent tilting of boom 222 as it is retracted. For example, extendable boom 222 may be further supported at rearward or inner end 222b by cantilever roller 264 engaging a flange or track (not shown) on extendable unit 224 which extends laterally inwardly from sides 254 at a level beneath cantilever roller 264 and engages a lower portion of cantilever roller 264. A forward cantilever roller (not shown) may alternately be implemented on an upper portion of forward end 222d of boom 222 to engage surface 254e as extendable boom 222 is retracted within extendable unit 224 to a point where the majority of the weight shifts rearward of roller carriage 223. Alternatively, a second, rearward roller carriage (not shown) may also be provided slightly inwardly of the midpoint to support rearward end 222b or an inner support roller (not shown) may be provided on sides 254 to rollingly engage side members 250 as extendable boom 222 is retracted within extendable unit 224. It is further envisioned that roller carriage 223 may include multiple low profile rollers and extend an appropriate length along extendable boom 222 such that extendable boom 222 is supported by roller carriage 223 toward rearward end 222b and thus sufficiently balanced when fully retracted into forward extendable unit 224.

By positioning a low profile roller carriage 223 vertically between lower portion 254a of side member 254 of extendable unit 224 and lower portion 250c of side members 250 of extendable boom 222, the vertical requirements of extendable unit 224 are minimized, while still allowing a fully nested extendable boom 222 to extend and retract therewithin. Furthermore, the low profile roller carriage 223 may be positioned substantially adjacent to or laterally inwardly from a vertical plane defined by side members 250. This allows extendable boom 222 to nest within outer extendable unit 224, while minimizing the effect on the width of the conveyor surface provided by extendable boom 222 with respect to the width of the conveying surface of the rest of the extendable conveyor 200. Because the rollers 224a, 224c and 224b of extendable unit 224 are mounted to a laterally inwardly positioned section 254b of sides 254, the mounting brackets and cross members do not interfere with side members 250 of extendable boom 222 as the boom is retracted within unit 224.

Extendable boom 222 may further include a drive motor (not shown) for rotating cantilever support rollers 264, in order to extend and/or retract extendable boom 222 within extendable unit 224, in response to actuation of an appropriate control on control panel 290. Alternatively, however, the drive motor may drive an inner support roller (not shown) or extendable boom 222 may be manually extended and retracted within extendable unit 224, without affecting the scope of the present invention.

Extendable conveyor 200 preferably further includes an electrical cable (not shown) which may be routed through the extendable units in a conventional manner. Preferably, the cable is routed through the extendable units similar to the manner disclosed in the above referenced Gilmore '413 patent. In order to provide electrical connections to control panel 290 of extendable boom 222, an electrical cable 292 may be routed and secured along one of the sides 250 of extendable boom 222 (FIGS. 11 and 13). The electrical cable 292 is preferably routed within a unidirectionally flexible section of cable track, similar to electrical cable 92 in extendable conveyor 10, discussed above, such that the cable may reverse directions at rearward end 222b of extendable boom 222, while the cable remains in its proper lateral orientation along extendable unit 224.

Referring now to FIGS. 14–16, an extendable conveyor 300 may include at least one extendable unit 315 which is extendable and retractable relative to a base unit (not shown). Extendable conveyor 300 is shown with two extendable units 324 and 336 and a forward or outer extendable boom 322. The inner extendable units 315 and the base unit are preferably substantially similar to the extendable units 36, 34 and 32 and the base unit 12, described above with respect to extendable conveyor 10. Accordingly, no further discussion of the components and functionality of these units will be repeated herein. Extendable unit 324 is substantially similar to extendable unit 224 of conveyor 200, with rollers 324a, 324b and 324c to guide a continuous belt 340. However, extendable unit 324 comprises a pair of opposite side walls 354, which are substantially C-shaped and similar to side walls 54 of extendable unit 24.

Extendable boom 322 comprises a pair of side members 351 which are interconnected at their upper ends by an upper conveying portion 326 which supports conveying belt 340. A pair of opposite support members 350 extend along a lower edge 351a of side members 351 to support extendable boom 322 as the support members engage at least one support roller on extendable unit 324. Extendable boom 322 further includes a rearward belt roller 380 and a forward belt roller 384, which are generally similar to the rollers of extendable boom 222, discussed above.

Extendable boom 322 further includes a support system 337, which includes a cantilever support roller 364 and a forward support roller 360, which is rotatably mounted to a bracket 361 at an outer end 354a of side walls 354 of extendable unit 324. Cantilever support roller 364 is rotatably mounted at an inner end 322a of extendable boom 322, similar to cantilever support roller 264 of extendable boom 222. An inner support roller 362 may also be rotatably mounted on extendable boom 322 to engage extendable unit 324 and support inner end 322a of extendable boom 322 as it is retracted within extendable unit 324, similar to support roller 62 of extendable boom 22.

As best shown in FIG. 16, support roller 360 protrudes laterally inwardly from bracket 361 and rollingly engages an underside 350a of support members 350, thereby supporting and guiding extendable boom 322 as it extends and retracts within extendable unit 324. Preferably, the rollers 360 are positioned directly beneath support members 350. Because only a minimum space is required laterally outwardly from support members 350, this allows support members 350 and extendable boom 322 to nest within extendable unit 324, while being substantially laterally separated to provide a wider opening therebetween. This allows greater clearance between support members 350 for conveyor belt 340, thereby having a minimal affect on the range of conveyor belt widths which may be implemented on conveyor 300. This further facilitates maximizing the ratio of the conveyor belt width to the overall width of the extendable conveyor. Inner support roller 362 may be similarly positioned beneath support members 350.

As discussed above with respect to extendable booms 22 and 222, extendable boom 322 may further include a control panel (not shown) at an outer end 322b to allow an operator to extend, retract, raise and/or lower the extendable unit from the outer end of the conveyor. The control panel may further drive a drive motor to extend or retract extendable boom 322 relative to extendable unit 324. However, extendable boom 322 may otherwise include a handle 323 at its outer end for an operator to use to manually extend and retract extendable boom 322.

As extendable boom 322 is extended or retracted within extendable unit 324, outer support roller 360 rollingly engages underside 350a of support members 350, while inner support member 362 rollingly engages an upper surface 354a of a lower inwardly turned portion 354b of side members 354. As extendable boom 322 extends such that a majority of its weight is forwardly of outer support roller 360, cantilever rollers 362 engage an upper portion 354c of side members 354 to prevent downward movement of outer end 322b. Clearance is provided within extendable boom for belt 340 and outer roller 324b of extendable unit 324, such that the belt and roller do not interfere with movement of extendable boom 322 along extendable unit 324.

Accordingly, the present invention provides an extendable conveyor which includes an outermost extendable boom, which at least partially nests within the next inwardly positioned extendable unit. The extendable boom extends and retracts within the next inwardly positioned extendable unit and has a minimal effect on both height and width requirements for the next inwardly positioned extendable unit, which provides for a greater width of the conveying surface of the extendable boom over conventional conveyors. The outermost extendable boom is adaptable for extendable conveyors comprising one, two, three, four or more extendable units. By adding the additional extension, the extendable conveyors may achieve a greater overall length in their extended positions, while minimally effecting the floor space requirements for the extendable conveyor when in their retracted positions and the height of the base unit.

Because a greater width conveying surface may be provided on the extendable booms of the present invention, the ratio of the width of the conveyor belt to the overall width of the base unit may be maximized.

The present invention further provides an outermost extension which may be added to an existing two or four unit extendable conveyor with minimal reworking required for the existing extendable conveyor. Accordingly, the additional extension may provide a maximum extended length to reach farther into truck trailers, while having no affect on the required floor space for the unit in its retracted position. Because of the minimal affect on the existing conveyor, the additional extension may be an aftermarket installation, such that the entire extendable conveyor does not have to be replaced when additional length may become necessary.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. An extendable conveyor for conveying articles comprises:
   a base structure;
   at least one extendable unit adjustably positionable between a retracted position and an extended position relative to said base structure, said at least one extendable unit having an upper portion, which at least partially defines a first conveying portion; and
   an extendable boom at least partially nested Akin said at least one extendable unit and adjustably positionable between a retracted positional and an extended position relative to said at least one extendable unit, said extendable both defining a second conveying portion, wherein said extendable boom includes at least one Stever support member which engages said upper portion of said at least one extendable unapantileverly support said extendable boom relative to said at least one extendable unit when said extendable boom is at least partially extended relative to said at least one extendable unit.

2. The extendable conveyor of claim 1, wherein said at least one extendable unit is operable to telescopingly extend forwardly such that said at least one extendable unit is cantileverly supported by one of said base unit and a next most rearwardly positioned extendable unit of said at least one extendable unit, said at least one extendable unit being cantileverly supported by a cantilever roller extending downwardly from said at least one extendable unit and engaging a portion of the next most rearwardly positioned extendable unit.

3. The extendable conveyor of claim 1 further including a movable continuous conveyor belt which is movable along said first and second conveying portions.

4. The extendable conveyor of claim 1, wherein said first conveying portion has a first width and said second conveying portion has a second width, said second width being at least as great as said first width.

5. The extendable conveyor of claim 1, wherein said second conveying portion is extendable and retractable within said at least one extendable unit.

6. The extendable conveyor of claim 5 further including a movable continuous conveyor belt which is movable along said first and second conveying surface portions.

7. The extendable conveyor of claim 1 further including a drive system for extending and retracting said at least one extendable unit relative to said base structure.

8. The extendable conveyor of claim 7, wherein said extendable boom includes a control panel positionable at a forward end of said extendable boom, said control panel being operable to control said drive system.

9. The extendable conveyor of claim 8, wherein said control panel is electronically interconnected to a wiring system of said at least one extendable unit by an electronic cable routed along said extendable boom and within a unidirectionally flexible section of cable track.

10. The extendable conveyor of claim 1, further including a support system for said extendable boom, said support system including at least one forward support member and said at least one cantilever support member, said cantilever support member engaging said upper portion of said at least one extendable unit.

11. The extendable conveyor of claim 10, wherein said forward support member engages and supports said extendable boom and allows a greater width of said second conveying portion relative to a width of said first conveying portion.

12. The extendable conveyor of claim 10, wherein said support system further includes at least one rearward support member positionable near a rearward end of said extendable boom.

13. An extendable conveyor including a conveying surface for conveying articles and comprising:
    a base structure;
    at least one extendable unit adjustably positionable between a retracted position and an extended position relative to said base structure, said at least one extendable unit having a first conveying surface portion; and
    an extendable boom at least partially nested within said at least one extendable unit and adjustably positionable between a retracted position and an extended position relative to said at least one extendable unit, said extendable boom including a support portion that cantileverly supports said extendable boom in said at least one extendable unit, said extendable boom including a second portion positioned above said support portion and defining a second conveying surface portion, said second conveying surface portion being positionable at least partially above said first conveying surface portion.

14. The extendable conveyor of claim 13, wherein said second conveying surface portion has a second width and said first conveying surface portion has a first width, said second width being at least as great as said first width.

15. The extendable conveyor of claim 14, wherein said at least one extendable unit is operable to telescopingly extend outwardly such that said at least one extendable unit is cantileverly supported by said base unit and said at least one extendable unit.

16. The extendable conveyor of claim 13, wherein said extendable boom, said at least one extendable unit and said base structure share a common endless conveyor belt which travels along said first and second conveying surface portions.

17. The extendable conveyor of claim 13, further including a drive system for extending and retracting said at least one extendable unit relative to said base structure.

18. The extendable conveyor of claim 17, wherein said extendable boom further includes a control panel positioned at an outer end of said extendable boom, said control panel being electronically connected with said drive system.

19. The extendable conveyor of claim 18, wherein said control panel is connected to an electrical cable which is routed along said extendable boom within a unidirectionally flexible section of cable track, said electrical cable being connected with a second cable connected with said at least one extendable unit.

20. The extendable conveyor of claim 13, further including a support system for said extendable boom, said support system comprising at least one outer support member and at least one cantilever support member.

21. The extendable conveyor of claim 20, wherein said cantilever support member is positioned at an inner end of said support portion, said cantilever support member engaging an upper portion of said at least one extendable unit.

22. The extendable conveyor of claim 21, wherein said support system further includes at least one inner support member positionable near an inner end of said support portion.

23. An extendable conveyor including a conveying surface for conveying articles and comprising:
    a base structure;
    at least one extendable unit adjustably positionable between a retracted position and an extended position relative to said base structure, said at least one extendable unit having a first conveying surface portion; and
    an extendable boom at least partially nested within said at least one extendable unit and adjustably positionable between a retracted position and an extended position relative to said at least one extendable unit, said extendable boom including a support portion that cantileverly supports said extendable boom in said at least one extendable unit, said extendable boom including a second portion positioned above said support portion and defining a second conveying surface portion, said second conveying surface portion having a second width and said first conveying surface portion having a first width, said second width being at least as great as said first width, wherein said support portion of said extendable boom includes opposite support members which extend and retract within said at least one extendable unit, said second portion being interconnected with said support members at an outer end of said extendable boom.

24. The extendable conveyor of claim 23, wherein an outer end of said second portion is interconnected with an outer end of said support members such that an inner end of said second portion extends inwardly from said outer end of said support members and is positioned above at least a portion of said first conveying surface portion.

25. The extendable conveyor of claim 24, wherein said second portion is pivotally interconnected with said outer end of said support members.

26. The extendable conveyor of claim 24, wherein said extendable boom includes a plurality of conveying rollers positioned between said inner end of said second portion and said first conveying surface portion.

27. The extendable conveyor of claim 25, wherein said inner end of said second portion includes a roller for rolling engagement with said first conveying surface portion.

28. An extendable conveyor for conveying articles comprising:
    a base structure;
    at least one extendable unit adjustably positionable between a retracted position and an extended position relative to said base structure, said at least one extendable unit including a first conveying surface portion;
    an extendable boom which extends and retracts within said at least one extendable unit, said extendable boom having a second conveying surface portion; and a support system for said extendable boom, said support system including at least one inward cantilever support and at least one outward roller carriage, said roller carriage including at least one roller which is operable to roll relative to said at least one extendable unit and said extendable boom such that said roller carriage moves outwardly relative to said at least one extendable unit as said extendable boom moves outwardly relative to said roller carriage and said at least one extendable unit, said extendable boom moving approximately twice the distance that said roller carriage moves relative to said at least one extendable unit.

29. The extendable conveyor of claim 28, wherein said at least one extendable unit is operable to telescopingly extend outwardly such that said at least one extendable unit is cantileverly supported by one of said base unit and a next most inwardly positioned extendable unit of said at least one extendable unit.

30. The extendable conveyor of claim 28, further including a continuous conveyor belt, said continuous conveyor belt being routed around a plurality of rollers in said extendable boom and said at least one extendable unit.

31. The extendable conveyor of claim 30, wherein said at least one extendable unit includes first and second belt rollers at an inner end thereof and a third belt roller at an outer end thereof, said first and second belt rollers being positioned such that said continuous conveyor belt reverses around said first belt roller and is guided downwardly as it travels outwardly toward said second belt roller, such that said continuous conveyor belt travels along a lower portion of said at least one extendable unit as it travels toward said third belt roller, thereby providing clearance within said at least one extendable unit for retraction of said extendable boom therewithin.

32. The extendable conveyor of claim 28, wherein said extendable boom includes a control panel positionable at an outer end of said extendable boom, said control panel being operable to control a drive system for extending and retracting said at least one extendable unit relative to said base structure.

33. The extendable conveyor of claim 32, wherein said control panel is electronically connected to a wiring system of said at least one extendable unit by an electronic cable routed along said extendable boom and within a unidirectionally flexible section of cable track.

34. The extendable conveyor of claim 28, wherein said extendable boom has a pair of opposite side members, said roller carriage rollingly engaging each of said side members of said extendable boom and a lower portion of said at least one extendable unit.

35. The extendable conveyor of claim 34, wherein at least a portion of said roller carriage is positioned beneath said side member laterally inwardly adjacent to a vertical plane defined by said side member to allow a reduced range in widths of said extendable boom and said at least one extendable unit and thereby a greater width of said second conveying surface portion relative to the width of said first conveying surface portion.

36. The extendable conveyor of claim 34, wherein said second conveying surface portion is interconnected along an upper portion of said side members of said extendable boom, said second conveying surface portion extending and retracting within said at least one extendable unit.

37. The extendable conveyor of claim 34, wherein said at least one extendable unit includes a pair of sidewalls which further include a generally horizontal track protruding laterally inwardly along said lower portion of said at least one extendable unit, said roller carriage being operable to roll along said track when said extendable boom is extended and retracted relative to said at least one extendable unit.

38. The extendable conveyor of claim 37, wherein said cantilever support member is positioned at an inner end of said side members, said cantilever support member extending at least partially above an upper surface of said side members to engage an upper structure of said at least one extendable unit, said cantilever support member being vertically adjacent to a horizontal plane defined by said upper surface of said side members to allow a reduced range in height of said at least one extendable unit.

39. An extendable conveyor for conveying articles comprises:

a base structure;

at least one extendable unit adjustably positionable between a retracted position and an extended position relative to said base structure, said at least one extendable unit having an upper portion, which at least partially defines a first conveying portion; and an extendable boom at least partially nested within said at least one extendable unit and adjustably positionable between a retracted position and an extended position relative to said at least one extendable unit, said extendable boom defining a second conveying portion, wherein said extendable boom engages said upper portion of said at least one extendable unit to cantileverly support said extendable boom relative to said at least one extendable unit when said extendable boom is at least partially extended relative to said at least one extendable unit. wherein said extendable boom comprises said second conveying portion and a support portion, a forward end of said second conveying portion being interconnected to a forward end of said support portion and extending rearwardly therefrom and vertically above at least a portion of said first conveying portion of said at least one extendable unit.

40. The extendable conveyor of claim 39, wherein said forward end of said second conveying portion is pivotally interconnected with said forward end of said support portion.

41. The extendable conveyor of claim 40, wherein a rearward end of said second conveying portion includes a support roller for rolling engagement with said first conveying portion.

42. The extendable conveyor of claim 41, wherein said extendable boom includes a plurality of conveying rollers positionable between said rearward end of said second conveying portion and said first conveying portion.

43. An extendable conveyor for conveying articles comprises:

a base structure;

at least one extendable unit adjustably positionable between a retracted position and an extended position relative to said base structure, said at least one extendable unit having an upper portion, which at least partially defines a first conveying portion; and an extendable boom at least partially nested within said at least one extendable unit and adjustably positionable between a retracted position and an extended position relative to said at least one extendable unit, said extendable boom defining a second conveying portion, wherein said extendable boom engages said upper portion of said at least one extendable unit to cantileverly support said extendable boom relative to said at least one extendable unit when said extendable boom is at least partially extended relative to said at least one extendable unit; and a support system for said extendable boom, said support system including at least one forward support member and at least one cantilever support member, said cantilever support member engaging said upper portion of said at least one extendable unit, wherein said forward support member comprises a plurality of low profile rollers which rollingly engage both said extendable boom and said at least one extendable unit.

44. The extendable conveyor of claim 43, wherein said at least one extendable unit includes a pair of sidewalls which further include a generally horizontal track protruding laterally inwardly along a lower portion of said sidewalls, said forward support member being operable to roll along said track when said extendable boom is extended and retracted relative to said at least one extendable unit.

45. The extendable conveyor of claim 44, wherein said forward support member rolls forwardly along said track as said extendable boom is extended such that said extendable boom moves approximately twice the distance that said forward support member moves relative to said at least one extendable unit.

46. The extendable conveyor of claim 44, wherein said extendable boom includes a pair of opposite side members, said second conveying surface being interconnected along an upper edge of said side members, said second conveying surface extending and retracting within said at least one extendable unit while said forward support member rollingly engages said track and a lower surface of said side members.

47. An extendable conveyor for conveying articles comprises:

a base structure;

at least one extendable unit adjustably positionable between a retracted position and an extended position relative to said base structure, said at least one extendable unit having an upper portion, which at least partially defines a first conveying portion;

an extendable boom at least partially nested within said at least one extendable unit and adjustably positionable between a retracted position and an extended position relative to said at least one extendable unit, said extendable boom defining a second conveying portion, wherein said extendable boom engages said upper portion of said at least one extendable unit to cantileverly support said extendable boom relative to said at least one extendable unit when said extendable boom is at least partially extended relative to said at least one extendable unit;

a support system for said extendable boom, said support system including at least one forward support member and at least one cantilever support member, said cantilever support member engaging said upper portion of said at least one extendable unit, said support system including at least one rearward support member positionable near a rearward end of said extendable boom; and a drive system for extending and retracting said extendable boom relative to said at least one extendable unit, said drive system driving one of said support members of said support system.

48. An extendable conveyor for conveying articles comprises:

a base structure;

at least one extendable unit adjustably positionable between a retracted position and an extended position relative to said base structure, said at least one extendable unit having an upper portion, which at least partially defines a first conveying portion; and an extendable boom at least partially nested within said at least one extendable unit and adjustably positionable between a retracted position and an extended position relative to said at least one extendable unit, said extendable boom defining a second conveying portion, wherein said extendable boom engages said upper portion of said at least one extendable unit to cantileverly support said extendable boom relative to said at least one extendable unit when said extendable boom is at least partially extended relative to said at least one extendable unit;

a drive system for extending and retracting said at least one extendable unit relative to said base structure; and a second drive system for extending and retracting said extendable boom relative to said at least one extendable unit.

49. An extendable conveyor for conveying articles comprises:

a base structure;

at least one extendable unit adjustably positionable between a retracted position and an extended position relative to said base structure, said at least one extendable unit having an upper portion, which at least partially defines a first conveying portion;

an extendable boom at least partially nested within said at least one extendable unit and adjustably positionable between a retracted position and an extended position relative to said at least one extendable unit, said extendable boom defining a second conveying portion, wherein said extendable boom engages said upper portion of said at least one extendable unit to cantileverly support said extendable boom relative to said at least one extendable unit when said extendable boom is at least partially extended relative to said at least one extendable unit; and a first movable continuous conveyor belt which is movable along said first conveying portion and a second movable continuous conveyor belt which is movable along said second conveying portion.

50. An extendable conveyor including a conveying surface for conveying articles and comprising:

a base structure;

at least one extendable unit adjustably positionable between a retracted position and an extended position relative to said base structure, said at least one extendable unit having a first conveying surface portion; and an extendable boom at least partially nested within said at least one extendable unit and adjustably positionable between a retracted position and an extended position relative to said at least one extendable unit, said extendable boom including a support portion that cantileverly supports said extendable boom in said at least one extendable unit, said extendable boom including a second portion positioned above said support portion and defining a second conveying surface portion, wherein said at least one extendable unit and said base structure include a first endless conveyor belt which travels along said first conveying surface portion and said extendable boom includes a second endless conveyor belt which travels along said second conveying surface portion.

51. An extendable conveyor including a conveying surface for conveying articles and comprising:

a base structure;

at least one extendable unit adjustably positionable between a retracted position and an extended position relative to said base structure, said at least one extendable unit having a first conveying surface portion;

an extendable boom at least partially nested within said at least one extendable unit and adjustably positionable between a retracted position and an extended position relative to said at least one extendable unit, said extendable boom including a support portion that cantileverly supports said extendable boom in said at least one extendable unit, said extendable boom including a second portion positioned above said support portion and defining a second conveying surface portion; and a drive system for extending and retracting said at least one extendable unit relative to said base structure, wherein said extendable boom is extendable by said drive system at a rate which is twice a rate that said drive system extends an outermost unit of said at least one extendable unit.

52. An extendable conveyor including a conveying surface for conveying articles and comprising:

a base structure;

at least one extendable unit adjustably positionable between a retracted position and an extended position relative to said base structure, said at least one extendable unit having a first conveying surface portion;

a drive system for extending and retracting said at least one extendable unit relative to said base structure; and an extendable boom at least partially nested within said at least one extendable unit and adjustably positionable between a retracted position and an extended position relative to said at least one extendable unit, said extendable boom including a support portion that cantileverly supports said extendable boom in said at least one extendable unit, said extendable boom including a second portion positioned above said support portion and defining a second conveying surface portion, wherein said extendable boom includes a second drive system for extending and retracting said extendable boom relative to said at least one extendable unit.

53. An extendable conveyor including a conveying surface for conveying articles and comprising:

a base structure;

at least one extendable unit adjustably positionable between a retracted position and an extended position relative to said base structure, said at least one extendable unit having a first conveying surface portion;

an extendable boom at least partially nested within said at least one extendable unit and adjustably positionable between a retracted position and an extended position relative to said at least one extendable unit, said extendable boom including a support portion that cantileverly supports said extendable boom in said at least one extendable unit, said extendable boom including a second portion positioned above said support portion and defining a second conveying surface portion;

a support system for said extendable boom, said support system comprising at least one outer support member and at least one cantilever support member, said cantilever support member being positioned at an inner end of said support portion, said cantilever support member engaging an upper portion of said at least one extendable unit, said support system further including at least one inner support member positionable near an inner end of said support portion; and a drive system for extending and retracting said extendable boom relative to said outer extendable unit, said drive system driving at least one of said support members of said support system.

* * * * *

UNITED STATES PATENT AND TRADEMARK OFFICE
CERTIFICATE OF CORRECTION

PATENT NO. : 6,481,563 B1  Page 1 of 1
DATED : November 19, 2002
INVENTOR(S) : Phillip J. Gilmore It is certified that error appears in the above-identified patent and that said Letters Patent is hereby corrected as shown below:

<u>Column 9,</u>
Line 39, delete "," after "extendable"

<u>Column 14,</u>
Line 52, insert -- conveying surfaces or portions 24a, 36a, 34a, 32a and 28, respectively. Outermost extendable -- between "define" and "boom"

<u>Column 16,</u>
Line 31, "Akin" should be -- within --
Line 33, "Positional" should be -- position --
Line 35, "both" should be -- boom --
Line 36, "Stever" should be -- cantilever --
Line 38, "unapantileverly" should be -- unit to cantileverly --

<u>Column 17,</u>
Line 48, "Claim 14" should be -- Claim 13 --

<u>Column 20,</u>
Line 31, "." should be -- , -- after "unit"

Signed and Sealed this

Twenty-fifth Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,481,563 B1
DATED : November 19, 2002
INVENTOR(S) : Phillip J. Gilmore It is certified that error appears in the above-identified patent and that said Letters Patent is hereby corrected as shown below:

Column 9,
Line 39, delete "," after "extendable"

Column 4,
Line 52, insert -- conveying surfaces or portions 24a, 36a, 34a, 32a and 28, respectively. Outermost extendable -- between "define" and "boom"

Column 16,
Line 31, "Akin" should be -- within --
Line 33, "Positional" should be -- position --
Line 35, "both" should be -- boom --
Line 36, "Stever" should be -- cantilever --
Line 38, "unapantileverly" should be -- unit to cantileverly --

Column 17,
Line 48, "Claim 14" should be -- Claim 13 --

Column 20,
Line 31, "." should be -- , -- after "unit"

This certificate supersedes Certificate of Correction issued May 25, 2004.

Signed and Sealed this

Fifth Day of October, 2004

JON W. DUDAS
*Director of the United States Patent and Trademark Office*